(12) United States Patent
Nakai et al.

(10) Patent No.: US 10,860,994 B2
(45) Date of Patent: Dec. 8, 2020

(54) INFORMATION PROCESSING DEVICE, INFORMATION PROCESSING SYSTEM, COMPUTER READABLE MEDIUM, AND CONTROL METHOD

(71) Applicant: SHARP KABUSHIKI KAISHA, Sakai (JP)

(72) Inventors: Yasuhiro Nakai, Sakai (JP); Masao Saeda, Sakai (JP); Tetsuo Fukumoto, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 36 days.

(21) Appl. No.: 16/178,383

(22) Filed: Nov. 1, 2018

(65) Prior Publication Data

US 2019/0130375 A1 May 2, 2019

(30) Foreign Application Priority Data

Nov. 1, 2017 (JP) .................................. 2017-212190

(51) Int. Cl.
| | |
|---|---|
| *G06Q 20/00* | (2012.01) |
| *G06Q 20/18* | (2012.01) |
| *G06Q 20/22* | (2012.01) |
| *G06Q 20/20* | (2012.01) |
| *G07F 9/02* | (2006.01) |
| *G06Q 20/06* | (2012.01) |
| *G06Q 20/32* | (2012.01) |
| *G06Q 20/34* | (2012.01) |

(52) U.S. Cl.
CPC .......... *G06Q 20/18* (2013.01); *G06Q 20/065* (2013.01); *G06Q 20/204* (2013.01); *G06Q 20/29* (2013.01); *G06Q 20/322* (2013.01); *G06Q 20/3278* (2013.01); *G06Q 20/341* (2013.01); *G07F 9/023* (2013.01)

(58) Field of Classification Search
CPC ..... G06Q 20/18; G06Q 20/065; G06Q 20/322
USPC ...................................... 705/16, 17
See application file for complete search history.

(56) References Cited

U.S. PATENT DOCUMENTS

| | | | | |
|---|---|---|---|---|
| 9,016,570 | B1* | 4/2015 | Gluck ................... | G06K 7/084 |
| | | | | 235/435 |
| 2006/0138219 | A1* | 6/2006 | Brzezniak .......... | G06Q 30/0601 |
| | | | | 235/383 |
| 2009/0006254 | A1* | 1/2009 | Mumm ................ | G06Q 20/385 |
| | | | | 705/44 |
| 2009/0182634 | A1* | 7/2009 | Park ................... | G06Q 20/3274 |
| | | | | 705/14.36 |

(Continued)

FOREIGN PATENT DOCUMENTS

JP 2009-020751 A 1/2009

*Primary Examiner* — Rokib Masud
(74) *Attorney, Agent, or Firm* — ScienBiziP, P.C.

(57) ABSTRACT

An information processing device includes a near field communication unit and a display. The near field communication unit repeatedly transmits a read command by sequentially switching system codes corresponding to all respective types of electronic money which are usable in the information processing device at predetermined time interval, and detects electronic money corresponding to an electronic money medium which is held over the near field communication unit. A brand of the detected electronic money and a balance of the electronic money are displayed on the display.

9 Claims, 12 Drawing Sheets

(56) References Cited

U.S. PATENT DOCUMENTS

2015/0077228 A1\* 3/2015 Dua .................... G06Q 20/202
340/5.81

\* cited by examiner

INFORMATION PROCESSING DEVICE, INFORMATION PROCESSING SYSTEM, COMPUTER READABLE MEDIUM, AND CONTROL METHOD

BACKGROUND

1. Field

The present disclosure relates to an information processing device, an information processing system, a computer readable medium, and a control method, and, in particular, to an information processing device which includes an electronic money reading unit, an information processing system, a computer readable medium, and a control method.

2. Description of the Related Art

Japanese Unexamined Patent Application Publication No. 2009-20751 discloses an example in the related art. A vending machine in the related art includes a brand selection section that is used to select an electronic money settlement service of a plurality of brands, and an electronic money settlement control unit that performs settlement using the electronic money settlement service of a brand selected by the brand selection section. After a product is selected, an electronic money medium is held over, the settlement is completed by the electronic money settlement control unit, and thus the product, which is accommodated in the vending machine, is sold.

In a case where an electronic money medium whose type is different from a type of the selected electronic money is held over the vending machine in the related art, it is not possible to perform settlement, and thus there is a case where it is not possible to provide a product. Therefore, a user is demanded to properly recognize the type of the electronic money possessed by the user.

However, in a case where the user possesses a plurality of types of electronic money, there is a problem in that it is difficult to properly manage the plurality of types of electronic money.

SUMMARY

It is desirable to provide a new information processing device, an information processing system, a computer readable medium, and a control method.

It is further desirable to provide an information processing device, an information processing system, a computer readable medium, and a control method, which are capable of causing a user to properly manage a plurality of types of electronic money and improving convenience of a user.

According to an aspect of the disclosure, there is provided an information processing device, which includes a display and an electronic money reading unit, including: an electronic money detection section that is detectable a plurality of types of electronic money by the electronic money reading unit by executing a polling process of sequentially switching a plurality of signals corresponding to the plurality of types of electronic money at predetermined time interval to transmit the signals to an electronic money medium; an electronic money information detection section that detects electronic money information on the electronic money detected by the electronic money detection section; and a display section that causes the display to display the electronic money information, which is detected by the electronic money information detection section According to another aspect of the disclosure, there is provided an information processing system including: an information processing device; and an image forming device that is communicable with the information processing device.

According to still another aspect of the disclosure, there is provided a computer readable medium storing a control program of an information processing device, which includes a display and an electronic money reading unit, the control program causing a processor of the information processing device to function as: an electronic money detection section that is detectable a plurality of types of electronic money by the electronic money reading unit by executing a polling process of sequentially switching a plurality of signals corresponding to the plurality of types of electronic money, at predetermined time interval to transmit the signals to an electronic money medium; an electronic money information detection section that detects electronic money information on the electronic money detected by the electronic money detection section; and a display section that causes the display to display the electronic money information, which is detected by the electronic money information detection section.

According to still another aspect of the disclosure, there is provided a control method causing a processor of an information processing device, which includes a di pi y and an electronic money reading unit, to perform a process, the process including: detecting a plurality of types of electronic money by the electronic money reading unit by executing a polling process of sequentially switching a plurality of signals corresponding to the plurality of types of electronic money at predetermined time interval to transmit the signals to an electronic money medium; detecting electronic money information on the detected electronic money; and causing the display to display the detected electronic money information.

DESCRIPTION OF THE EMBODIMENTS

First Embodiment

Figure 1:
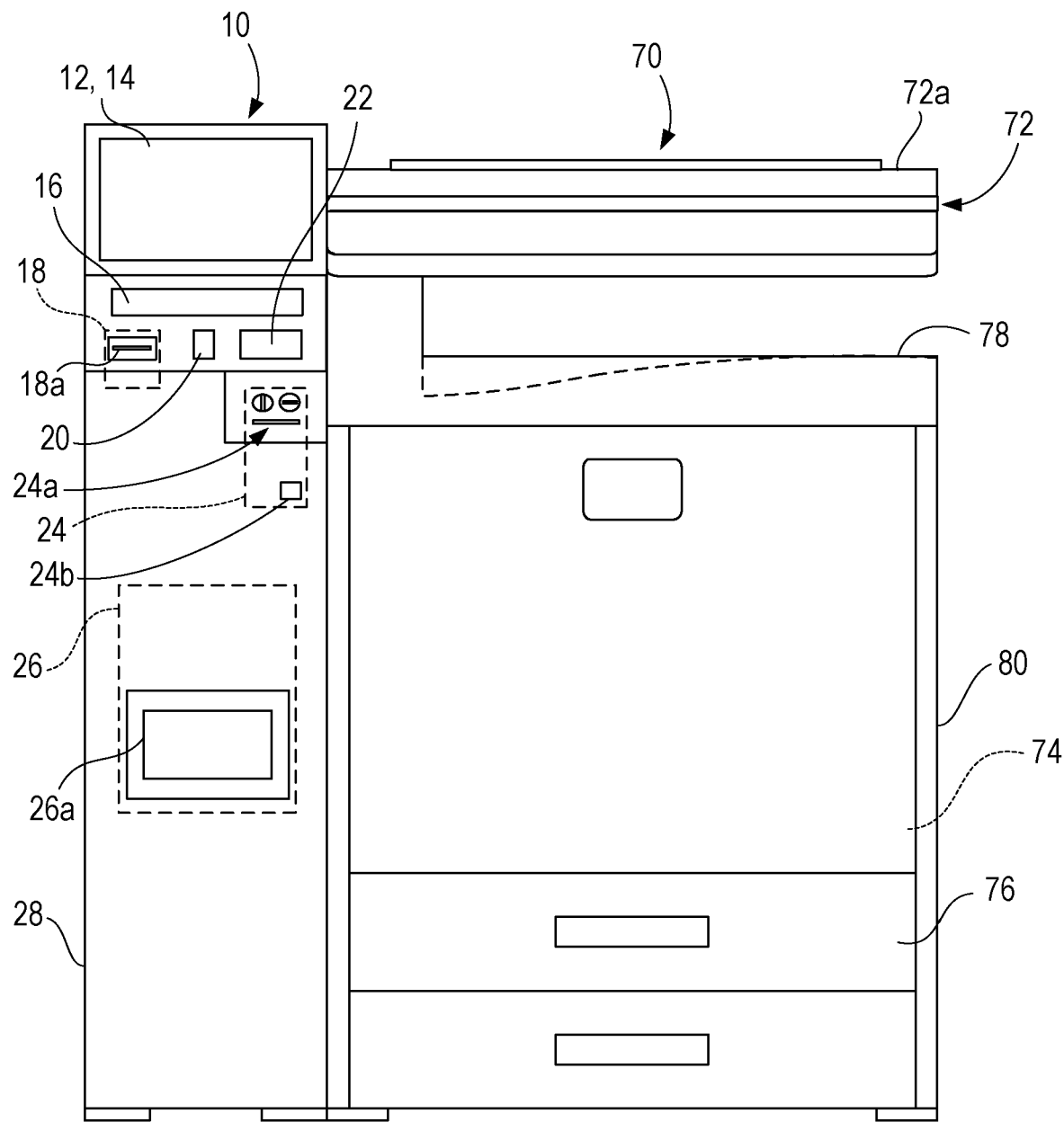
FIG. 1 is a perspective diagram illustrating an exterior configuration of an information processing system according to a first embodiment of the disclosure.

FIG. 1 is a diagram illustrating a configuration of an information processing system 100 according to the first embodiment of the disclosure. Referring to FIG. 1, the information processing system 100 according to a first embodiment of the disclosure includes an information processing device 10 and an image forming device 70.

The information processing device 10 is a multimedia kiosk (MMK) terminal which is installed in a store, such as a supermarket, a restaurant, or a convenience store, or a public facility such as a station, a bus terminal, an airport, a government office, or a library. The information processing device 10 provides various pieces of information or a predetermined product or service (hereinafter, there is a case of being referred to as "service or the like") to a user in response to a location where the information processing device 10 is disposed. In addition, although details will be described later, the information processing device 10 is capable of providing the predetermined service, such as copying, printing, scanning, or faxing, to the user in cooperation with the image forming device 70.

Meanwhile, in the specification, a front and back direction (a depth direction) of the information processing device 10 and configuration members thereof is prescribed while setting a surface which faces a location where the user stands, that is, a surface on a side where a display 14 which will be described later is provided to a forward surface (front surface), and a right and left direction (a lateral direction) of the information processing device 10 and the configuration members thereof is prescribed on the basis of a state in which the information processing device 10 is viewed from the user. The directions are the same as in the image forming device 70.

The information processing device 10 includes a device main body 28 which includes the display 14 equipped with a touch panel 12, a recording medium connection unit 16, a paper piece printer 18, a symbol reading unit 20, a near field communication unit 22, a money processing unit 24, and a photo printer 26.

The display 14 equipped with the touch panel 12 is disposed at an upper end part of the information processing device 10 (device main body 28). The touch panel 12 is a general-purpose touch panel, and it is possible to use an arbitrary type, such as an electrostatic capacitive type, an electromagnetic induction type, resistive film type, or an infrared ray type, of the touch panel. In the first embodiment, an electrostatic capacitive type touch panel is used as the touch panel 12, and the touch panel 12 is provided on a display surface of the display 14. However, a touch panel display, in which the touch panel 12 and the display 14 are integrally formed, may be used. In addition, for example, it is possible to use an LCD, an electroluminescence (EL) display or the like as the display 14.

The recording medium connection unit 16 includes a mounting unit (for example, a drive and a memory slot) for mounting various recording media. The various recording media includes an optical disk (for example, a CD-R, a DVD-R, or a BD-R), a flash memory (for example, a USB memory, an SD memory card, or a memory stick), and the like. It is to be noted that the optical disk is mounted on the drive. In addition, the flash memory is mounted on the memory slot.

The paper piece printer 18 includes, for example, a thermal printer (thermosensitive printer) or a dot impact printer, and issues a receipt, a journal, or a paper piece on which an image of a coupon or the like is printed. Specifically, the paper piece printer 18 prints various text strings, images, code patterns (a barcode and the like), or the like on a roll paper, and discharges a completely printed paper piece from a paper ejection unit 18a.

The symbol reading unit 20 includes, for example, a laser scanner, a camera, or the like, and is capable of reading a symbol which is attached to a product, a card, a receipt, or the like, a symbol which is displayed on a screen of the user terminal (mobile terminal), or the like. Examples of the symbol, which is allowed to be read by the symbol reading unit 20, include a barcode (one-dimensional barcode) or a 2-dimensional code (for example, a QR code (registered trademark), a micro QR code, a Data MATRIX, a Maxi-CODE, a VeriCODE, or the like).

The near field communication unit 22 wirelessly performs contactless data communication with a communication target in conformity to, for example, a communication standard (so-called near field communication (NFC)) such as ISO/IEC18092. For example, the near field communication unit 22 wirelessly performs the contactless data communication with the communication target, such as an electronic money medium, in conformity to, for example, a communication standard such as Felica (registered trademark). The electronic money medium is an IC card and a mobile terminal (a feature phone, a smart phone, a tablet PC, or the like). In addition, the electronic money medium includes a storage unit which stores data (electronic money data) relevant to a settlement using electronic money. A communicable distance of the near field communication unit 22 is approximately a few centimeters to a few meters. For example, the near field communication unit 22 transmits a signal (read command), for instructing the electronic money medium to read electronic money data stored in the electronic money medium. The electronic money medium transmits the electronic money data to the near field communication unit 22 in response to the read command. In addition, the near field communication unit 22 transmits data (write data) to be written in the electronic money medium and a signal (write command) for instructing the electronic money medium to write the data. The electronic money medium writes (stores) the received write data in the storage unit in accordance with the write command. As described above, the near field communication unit 22 also functions as an electronic money reading unit. Meanwhile, the near field communication unit 22 is capable of communicating data other than the electronic money data with a communication target (for example, an identification card, a membership card, an employee card, or the like) other than the electronic money medium.

The money processing unit 24 includes a money insertion part 24a and a coin return opening 24b. The money insertion part 24*a* includes a coin insertion opening, a paper money insertion opening, a change return lever, and the like, and is disposed below the near field communication unit 22. A coin inserted from the coin insertion opening and paper money inserted from the paper money insertion opening are each classified for respective types and are accommodated in predetermined money storage sections (not illustrated in the drawing). The money storage sections include a coin storage section and a paper money storage section. In a case where the coin or the paper money is inserted, the amount of inserted money is calculated in accordance with the type and the number of coins accommodated in the coin storage section and the type and the number of paper money accommodated in the paper money storage section. In a case where the predetermined service or the like is performed in the information processing device 10, costs (the charge relevant to provision of the service or the like) based on content of the service are subtracted from the amount of inserted money, and the amount of money (balance), which remains after subtracting the charge from the amount of inserted money, is calculated. In addition, in a case where the change return lever is operated, a coin or paper money is returned based on the balance. However, the coin is returned from the coin return opening 24*b* provided below the money insertion part 24*a*, and the paper money is returned from the paper money insertion opening.

The photo printer 26 is, for example, a sublimation type printer or an ink jet printer, and prints an image on a photo paper. A photograph, which is printed by the photo printer 26, is discharged to a discharge unit 26*a*. However, image data stored in the recording medium connected to the recording medium connection unit 16, image data transmitted from an external computer, or the like is used as image data to form the image on the paper. In addition, a size of the photograph to be printed by the photo printer 26 includes an L size, a postcard size, a 2L size, or the like.

Figure 2:
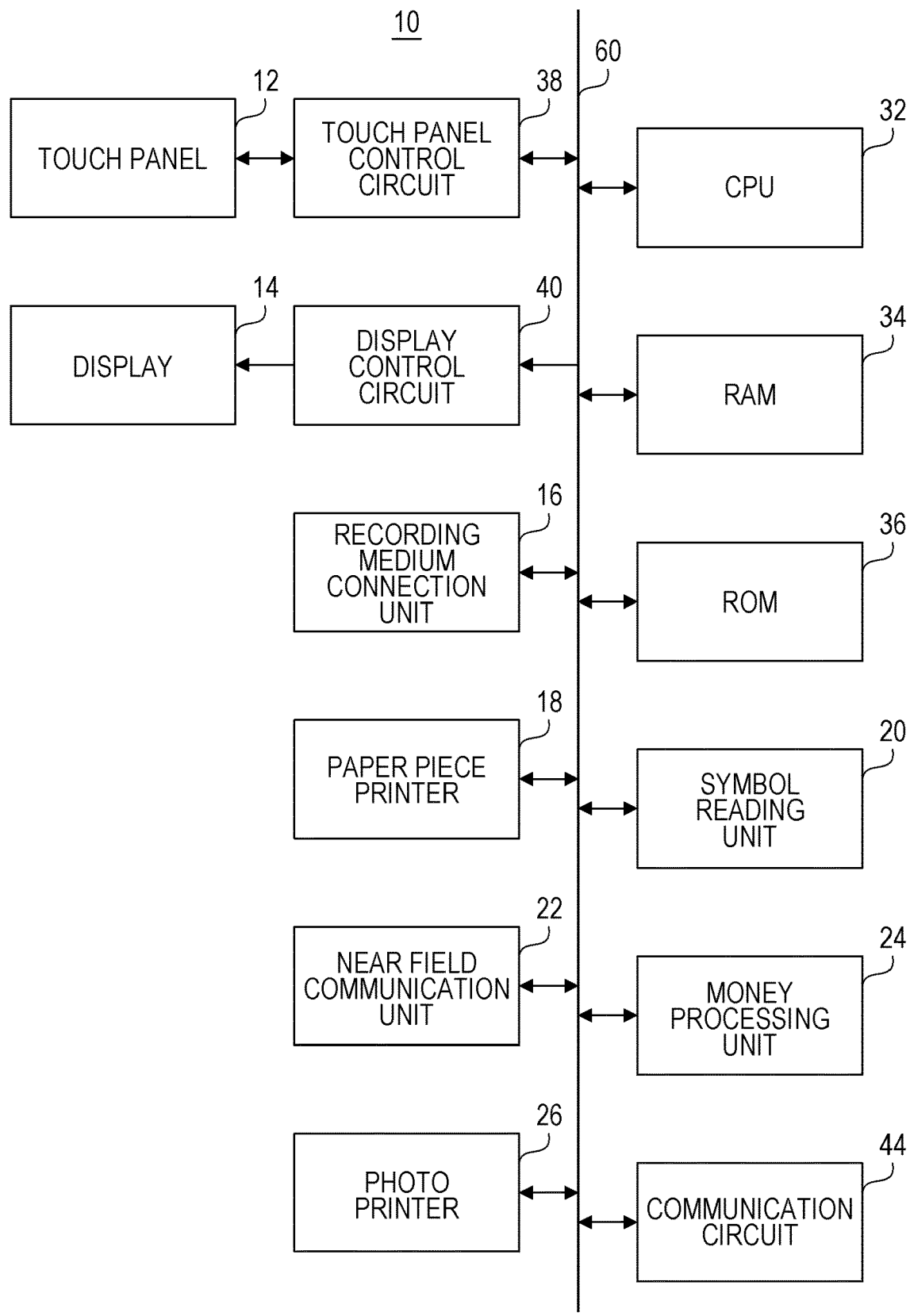
FIG. 2 is a block diagram illustrating an electrical configuration of an information processing device illustrated in FIG. 1.

FIG. 2 is a block diagram illustrating an electrical configuration of the information processing device 10 illustrated in FIG. 1. Referring to FIG. 2, the information processing device 10 includes a CPU 32. A RAM 34, a ROM 36, a touch panel control circuit 38, a display control circuit 40, the recording medium connection unit 16, the paper piece printer 18, the symbol reading unit 20, the near field communication unit 22, the money processing unit 24, the photo printer 26, and a communication circuit 44 are connected to the CPU 32 through a bus 60. In addition, the touch panel 12 is connected to the touch panel control circuit 38, and the display 14 is connected to the display control circuit 40.

The CPU 32 performs overall control on the information processing device 10. The RAM 34 is used as a work area and a buffer area for the CPU 32. The ROM 36 stores a startup program of the information processing device 10 and default values for various information.

The touch panel control circuit 38 applies a desired voltage or the like to the touch panel 12, detects a touch operation (touch input) within an available touch range of the touch panel 12, and output touch coordinate data, which indicates a touch input location, to the CPU 32.

The display control circuit 40 includes a GPU, a VRAM, or the like. The CPU generates display image data, which is to display various screens on the display 14, in the VRAM using image generation data stored in the RAM 34 under an instruction of the CPU 32, and outputs the generated display image data to the display 14.

The communication circuit 44 is a communication circuit used to connect a network such as the Internet. The communication circuit 44 is a wired communication circuit or a wireless communication circuit, and communicates with an external computer (external terminal), such as a server, in accordance with the instruction from the CPU 32 via the network. However, the communication circuit 44 is also capable of directly communicating with the image forming device 70, a mobile terminal, or the like in a wired or wireless manner (for example, using an infrared ray method, a Wi-Fi (registered trademark) method, or a Bluetooth (registered trademark) method) without passing via the network.

It is to be noted that, the electrical configuration of the information processing device 10 illustrated in FIG. 2 is only an example, and the disclosure is not limited thereto.

Returning to FIG. 1, the image forming device 70 is a multifunction peripheral (MFP) which includes a copy function, a printer function, a scanner function, a facsimile function, and the like.

The image forming device 70 includes a device main body 80 which includes an image reading unit 72, an image forming unit 74, a paper feeding unit 76, and a paper discharge tray 78. Meanwhile, the image forming device 70 is installed in a vicinity of the information processing device 10. For example, the image forming device 70 is provided to be adjacent to a right side of the information processing device 10.

The image reading unit 72 includes a document pedestal which is formed of a transparent material, and is built in the device main body 80. A document pressing cover 72*a* is attached at an upper part of the document pedestal to be openable/closable through a hinge or the like.

In addition, the image reading unit 72 includes a light source, a plurality of mirrors, an image formation lens, a line sensor, and the like. The image reading unit 72 exposes a document surface using the light source, and guides reflective light reflected from the document surface to the image formation lens by the plurality of mirrors. Furthermore, the image formation lens causes the reflective light to form an image on a light reception element of the line sensor. In the line sensor, brightness or chromaticity of the reflective light which forms the image on the light reception element is detected, and image data to be read is generated based on the image of the document surface. A charge coupled device (CCD), a contact image sensor (CIS), or the like is used as the line sensor.

The image forming unit 74 is built in the device main body 80, and is provided below the image reading unit 72. The image forming unit 74 includes a photosensitive drum, a charging section, an exposure section, a developing section, a transfer section, a fixing section, and the like. The image forming unit 74 forms an image on the recording medium (paper), which is conveyed from the paper feeding unit 76 or the like, using an electronic photograph method, and discharges the paper, on which the image is completely formed, to the paper discharge tray 78 provided between the image reading unit 72 and the image forming unit 74. However, image data which is read by the image reading unit 72, image data which is transmitted from the information processing device 10, image data which is transmitted from the external computer, or the like is used as image data 404*a* (refer to FIG. 8) for forming the image on the paper. In addition, the recording medium is not limited to the paper, and a sheet other than the paper, such as an OHP film, may be used.

Figure 3:
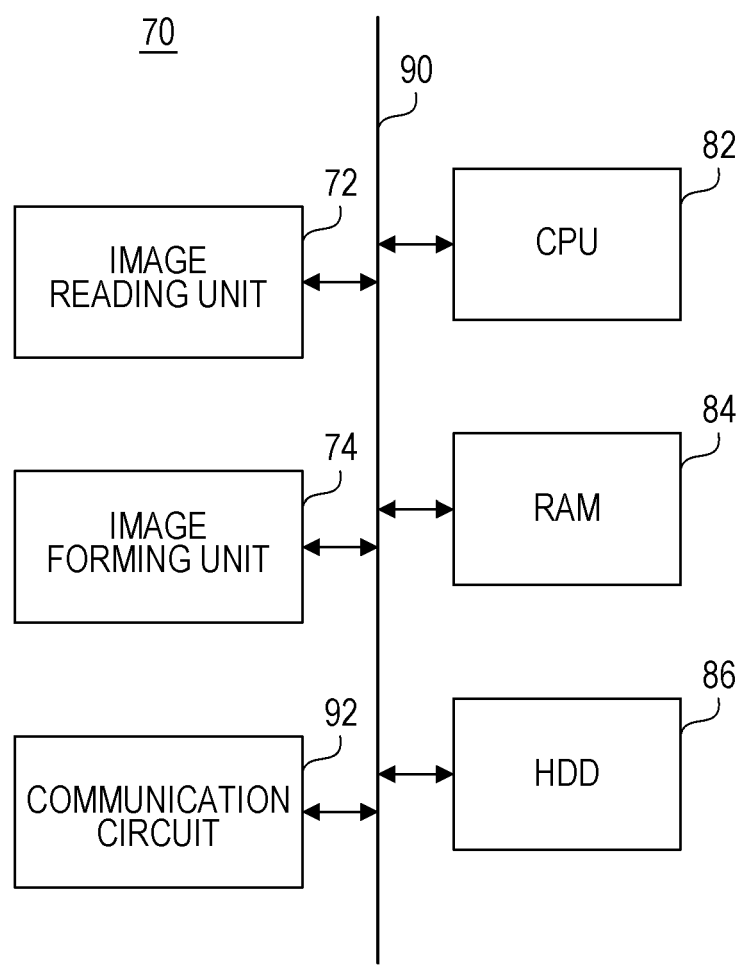
FIG. 3 is a block diagram illustrating an electrical configuration of an image forming device illustrated in FIG. 1.

FIG. 3 is a block diagram illustrating an electrical configuration of the image forming device 70 illustrated in FIG. 1. Referring to FIG. 3, the image forming device 70 includes a CPU 82. A RAM 84, an HDD 86, the image reading unit 72, the image forming unit 74, and a communication circuit 92 are connected to the CPU 82 via a bus 90.

The CPU 82 performs overall control on the image forming device 70. The RAM 84 is used as a work area and a buffer area for the CPU 82.

The HDD 86 is a main storage unit of the image forming device 70, and appropriately stores a control program, which is used for the CPU 82 to control operations of respective parts of the image forming device 70, the display image data for the various screens, and the like. However, instead of the HDD 86 or together with the HDD 86, another non-volatile memory, such as an SSD, a flash memory, or an EEPROM, may be used.

The communication circuit 92 is a communication circuit for connecting the network such as the Internet. The communication circuit 92 is a wired communication circuit or a wireless communication circuit, and communicates with the external computer, such as the server, via the network in accordance with an instruction from the CPU 82. However, the communication circuit 92 is also capable of directly communicating with the information processing device 10 in the wired or wireless manner without passing via the network.

It is to be noted that the electrical configuration of the image forming device 70 illustrated in FIG. 3 is only an example, and it is not demanded to be limited thereto.

In a case where the settlement is performed using the electronic money in the information processing system 100 which is configured as described above, there is a case where a plurality of electronic money brands (types) are displayed on the display 14 of the information processing device 10 and the user is caused to select electronic money for the settlement. Here, after the service or the like is selected, the settlement is performed using the electronic money for the settlement, and the settlement is completed, thereby providing the service or the like.

However, in a case where an electronic money medium whose type is different from a type of the electronic money for the settlement is held over the information processing system in the related art, it is not possible to perform the settlement, and thus it is not possible to provide the product. Therefore, the user is demanded to properly recognize the type of the electronic money possessed by the user.

However, in a case where the user possesses a plurality of types of electronic money, there is a problem in that it is difficult to properly grasp each of the types of the electronic money and a balance of each of the types of the electronic money, and the like. In addition, in recent years, the electronic money settlement service has become complicated and there is a case where mutual use is possible even though the types of the electronic money are different. Therefore, it becomes more difficult for the user to properly manage the electronic money.

Here, in the first embodiment, the electronic money is detected by performing a polling process to the electronic money medium, causing electronic money information for the detected electronic money to be displayed on the display 14.

Figure 4:
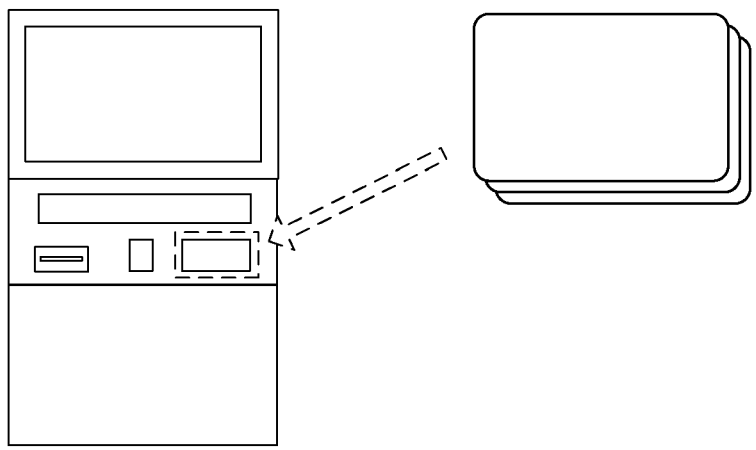
FIG. 4 is a diagram illustrating an example of an electronic money reception screen.
Figure 5:
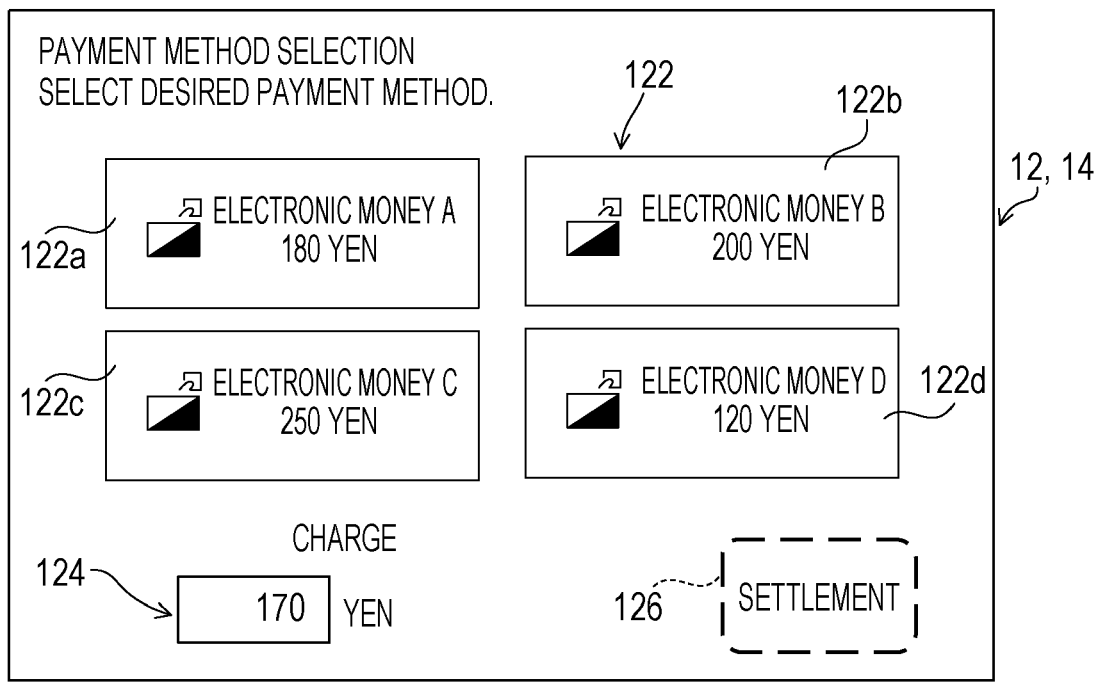
FIG. 5 is a diagram illustrating an example of a payment method selection screen.
Figure 6:
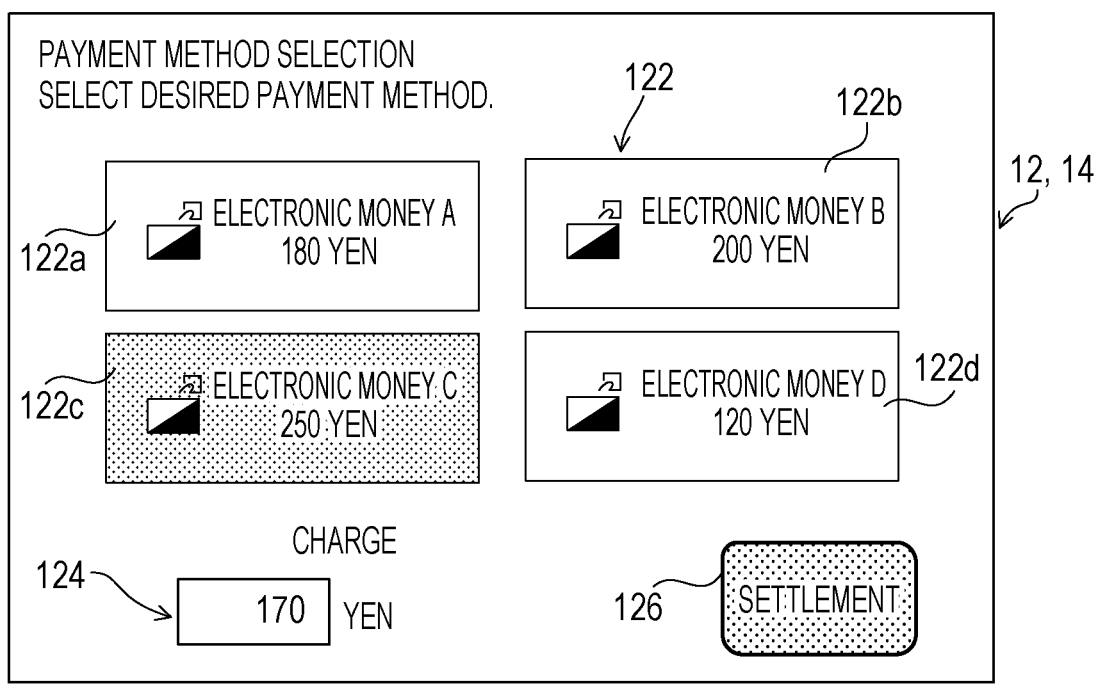
FIG. 6 is a diagram illustrating another example of the payment method selection screen.

Hereinafter, an example of an operation of the information processing system 100 will be described with reference to FIGS. 4 to 6. FIG. 4 is a diagram illustrating an example of an electronic money reception screen 110. FIG. 5 is a diagram illustrating an example of a payment method selection screen 120. FIG. 6 is a diagram illustrating iii example of the payment method selection screen 120 in a state in which one payment method is selected.

Although not illustrated in the drawings, the information processing system 100 according to the first embodiment displays various operation screens on the display 14 of the information processing device 10, and accepts a user operation in accordance with the touch input performed on the touch panel 12. The user selects a desired service or the like by touching an icon or the like which is displayed on the operation screen. Furthermore, if contents of the service or the like, which are desired by the user, are determined, the electronic money reception screen 110 is displayed on the display 14, as illustrated in FIG. 4.

The electronic money reception screen 110 is a screen to prompt the user to hold the electronic money medium (an IC card for the electronic money, the mobile terminal, or the like) possessed by the user over the near field communication unit 22. For example, on the electronic money reception screen 110, an image, which indicates a location of the near field communication unit 22 in the information processing device 10, an appropriate text string, a figure, and the like, which notify that it is possible to hold the electronic money medium over the near field communication unit 22, are displayed.

Furthermore, in the information processing device 10, if the electronic money medium corresponding to the electronic money which is usable in the information processing device 10 is held over the near field communication unit 22, the electronic money data included in the electronic money medium is read by the near field communication unit 22. The electronic money data includes data for a system code of the electronic money, data for the type of the electronic money, and data for the balance (electronic money balance) of the electronic money. That is, if the electronic money medium is held over the near field communication unit 22, various information (electronic money information) for the electronic money corresponding to the electronic money medium is read. As above, a fact that the electronic money information is read indicates a fact that the electronic money is detected.

An electronic money detection method in the information processing device 10 will be described in detail. In the information processing device 10, a read command, which is transmitted from the near field communication unit 22 toward the electronic money medium, includes system codes of a plurality of types of electronic money which are usable in the information processing device 10. However, the near field communication unit 22 sequentially switches (modulates) the system codes corresponding to all the respective types of electronic money which are usable in the information processing device 10 at predetermined time interval and repeatedly transmits the read command (polling process). For example, after the near field communication unit 22 transmits the read command, which includes a system code of a first type of electronic money, for the predetermined time, the near field communication unit 22 transmits the read command, which includes a system code of a second type of electronic money that is different from the first type of electronic money, for the predetermined time. Furthermore, after the read command which includes the system code of the second type of electronic money is transmitted for the predetermined time, the read command, which includes a system code of a third type of electronic money that is different from the second type of electronic money, is transmitted for the predetermined time. In the information processing device 10 according to the first embodiment, the above-described operation is repeatedly performed.

Furthermore, in a case where the system code included in the read command coincides with the system code of the electronic money corresponding to the electronic money medium, wireless communication connection is established between the near field communication unit 22 and the electronic money medium. If the wireless communication connection is established between the near field communication unit 22 and the electronic money medium, the electronic money data (electronic money information), which is stored in the electronic money medium, is transmitted from the electronic money medium to the near field communication unit 22.

As described above, in a case where the electronic money medium corresponding to the electronic money which is usable in the information processing device 10 is held over the near field communication unit 22 in the information processing device 10 according to the first embodiment, the electronic money corresponding to the electronic money medium is automatically detected. In contrast, in a case where the electronic money medium corresponding to the electronic money which is not possible to be used in the information processing device 10 is held over the near field communication unit 22, the electronic money is not detected. The reason is that, in a case of the electronic money which is not possible to be used in the information processing device 10, the system code included in the read command does not coincide with the system code of the electronic money corresponding to the electronic money medium.

In addition, in the information processing device 10 according to the first embodiment, there is a case where the IC cards for the plurality of types of electronic money are held over the near field communication unit 22 in a state in which the IC cards are superimposed. That is, there is a case where the plurality of electronic money media are simultaneously held. Here, in the information processing device 10, it is possible to detect the types of electronic money each corresponding to the plurality of electronic money media through the above-described polling process. That is, in the information processing device 10, it is possible to collectively detect the plurality of types of electronic money. The detection is performed in a similar manner to in a case where a mobile terminal, in which the plurality of types of electronic money data is stored, is held over the near field communication unit 22.

Furthermore, if the electronic money is detected and the electronic money data is acquired, the payment method selection screen 120 is displayed on the display 14 as illustrated in FIG. 5.

The payment method selection screen 120 is a screen to select the payment method (settlement method) of a charge relevant to provision of the service or the like (hereinafter, referred to a "charge of the service or the like"). The payment method selection screen 120 includes a plurality of selection icons 122, a charge display area 124, and a settlement icon 126.

Each of the plurality of selection icons 122 corresponds to each of the plurality of types of electronic money which are possible to be used in the information processing system 100, and is an icon used to select the payment method for settlement. However, in the first embodiment, each of the selection icons 122*a* to 122*d* corresponds to the payment method by the electronic money corresponding to the acquired electronic money data. FIG. 5 illustrates a case where four types of electronic money are detected.

Specifically, the selection icon 122*a* corresponds to electronic money A, the selection icon 122*b* corresponds to electronic money B, the selection icon 122*c* corresponds to electronic money C, and the selection icon 122*d* corresponds to electronic money D. In the selection icons 122*a* to 122*d*, suitable text strings, figures, or the like which indicate the electronic money brands are described such that it is possible to identify the electronic money brands corresponding thereto. Here, the money A, the electronic money B, the electronic money C, and the electronic money D each correspond to advance payment (prepaid)-type electronic money, and are brands of electronic money which are different from each other. In addition, electronic money balances corresponding to the amount of previously deposited money exist for each of the electronic money A, the electronic money B, the electronic money C, and the electronic money D. Meanwhile, in the selection icons 122*a* to 122*d*, the suitable text string or the like which indicates the electronic money balances are described such that it is possible to identity the electronic money balances corresponding thereto. For example, in the example illustrated in FIG. 5, the balance of the electronic money A is 180 yen, the balance of the electronic money B is 200 yen, the balance of the electronic money C is 250 yen, and the balance of the electronic money D is 120 yen. As described above, the payment method selection screen 120 is also a screen used to display the electronic money information, such as the type of the electronic money and the balance of the electronic money, which are detected through the above-described polling process.

In the charge display area 124, the amount of money of the charge for the service or the like is displayed. In the example illustrated in FIG. 5, "170 yen" is displayed as the amount of money of the charge for the service or the like. Meanwhile, the amount of money of the charge for the service or the like is determined according to contents of the service or the like which is desired by the user.

A function of performing the settlement is assigned to the settlement icon 126. In a case where the settlement icon 126 is touched (selected), settlement is performed using the electronic money (electronic money for the settlement) which is selected by the user. That is, the charge of the service or the like is paid using the electronic money for the settlement. However, the settlement icon 126 is valid in a case where the balance of the electronic money for the settlement reaches the amount of money of the charge for the service or the like. In contrast, in a case where the balance of the electronic money for the settlement does not reach the amount of money of the charge for the service or the like, the settlement icon 126 is invalid and is not selected even if it is touched. Accordingly, in a case where the settlement icon 126 is invalid, it is not possible to perform the settlement. Meanwhile, FIG. 5 illustrates a state in which the electronic money for the settlement is not selected. As above, in a case where the electronic money for the settlement is not selected, the balance of the electronic money for the settlement does not exist (0 (zero)), and thus the settlement icon 126 is invalid.

In a case where any of the selection icons 122*a* to 122*d* to select the electronic money for the settlement is touched (selected) on the payment method selection screen 120 illustrated in FIG. 5, the electronic money corresponding to the touched icon is selected as the electronic money for the settlement. For example, in a case where the selection icon 122*c* is touched as illustrated in FIG. 6, the electronic money C corresponding to the selection icon 122*c* is selected as the electronic money for the settlement in addition, in a case where the electronic money for the settlement is selected, a display aspect of the icon (the selection icon 122*c* in the example illustrated in FIG. 6) corresponding to the electronic money for the settlement changes. Meanwhile, in FIG. 6, a pattern is attached to the touched selection icon 122c. The pattern indicates that a suitable hue is given to the touched selection icon 122c.

Here, in a case where the electronic money for the settlement is selected and the balance of the electronic money for the settlement reaches the amount of money of the charge for the service or the like, the settlement icon 126 is valid. Accordingly, it is possible to select the settlement icon 126, and thus it is possible to perform the settlement. The balance of the electronic money C, which is selected as the electronic money for the settlement, is 250 yen and reaches the amount of money of the charge for the service or the like (170 yen). Therefore, in a case where the electronic money C is selected as the electronic money for the settlement, it is possible to perform the settlement.

In contrast, even in a case where the electronic money for the settlement is selected, the settlement icon 126 is not valid and remains as being invalid in a case where the balance of the electronic money for the settlement does not reach the amount of money of the charge for the service or the like. For example, the balance of the electronic money D is 120 yen and does not reach the amount of money of the charge for the service or the like (170 yen). Therefore, in a case where the electronic money D is selected as the electronic money for the settlement, the settlement icon 126 is not valid, and thus it is not possible to perform the settlement. Here, if another electronic money is selected as the electronic money for the settlement or the electronic money is selected again after increasing the balance of the electronic money, it is possible to perform the settlement.

The above-described operation of the information processing system 100 is realized in such a way that the CPU 32 of the information processing device 10 executes an information processing program, which is stored in the RAM 34, for the information processing device 10, and the CPU 82 of the image forming device 70 executes an information processing program, which is stored in the RAM 84, for the image forming device 70. A detailed process will be described later using a flowchart.

Figure 7:
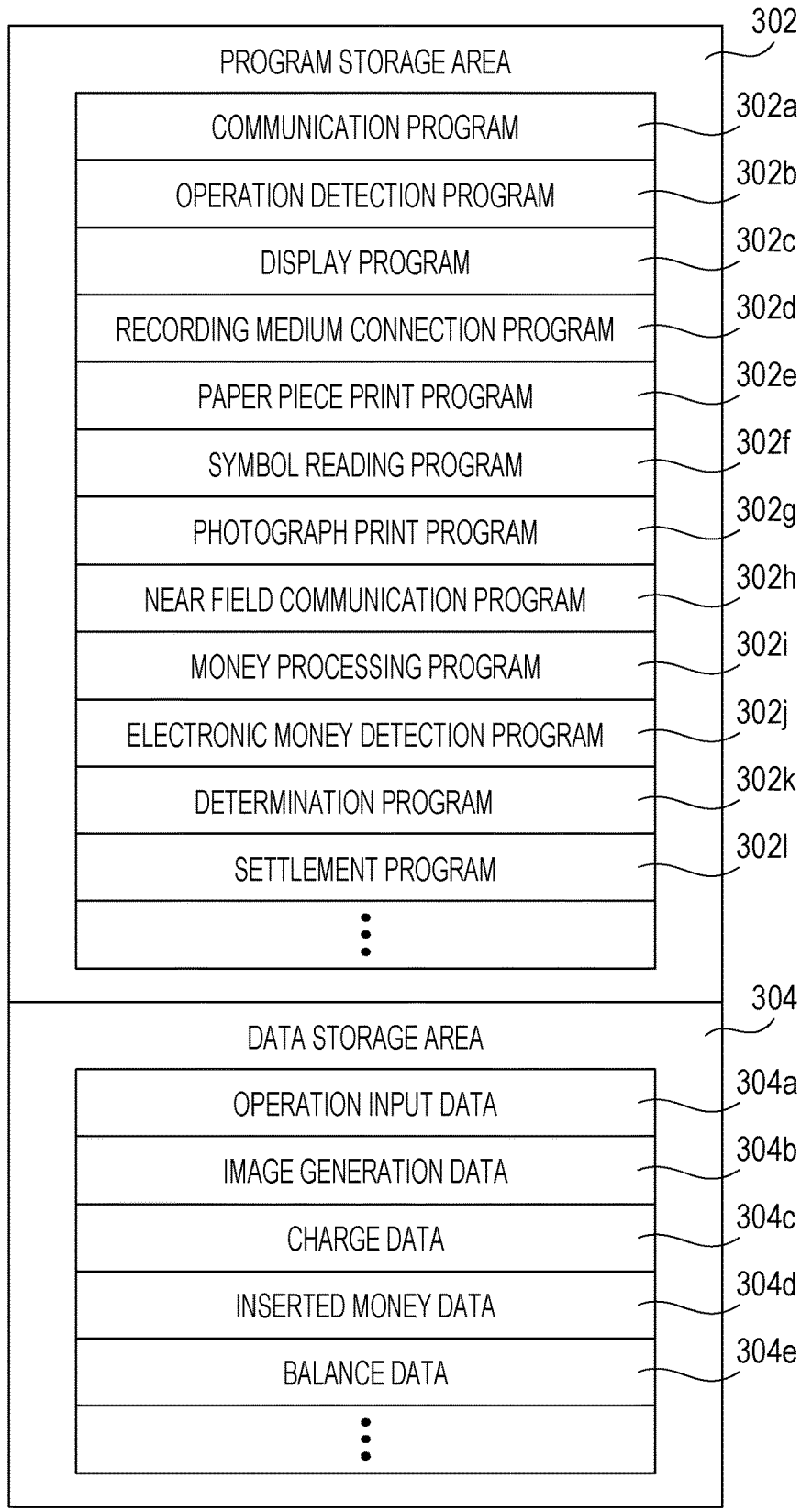
FIG. 7 is a diagram illustrating an example of a memory map of a RAM of the information processing device illustrated in FIG. 2.

FIG. 7 is a diagram illustrating an example of a memory map 300 of the RAM 34 of the information processing device 10 illustrated in FIG. 2. As illustrated in FIG. 7, the RAM 34 includes a program storage area 302 and a data storage area 304. As described above, the information processing program of the information processing device 10 is stored in the program storage area 302 of the RAM 34. The information processing program of the information processing device 10 includes a communication program 302a, an operation detection program 302b, a display program 302c, a recording medium connection program 302d, a paper piece print program 302e, a symbol reading program 302f, a photograph print program 302g, a near field communication program 302h, a money processing program 302i, an electronic money detection program 302j, a determination program 302k, and a settlement program 302l.

The communication program 302a is a program used to communicate (transmit and receive) data with the image forming device 70, another computer, such as the server, or another machine via the network.

The operation detection program 302b is a program to detect the touch input, and the CPU 32 acquires the touch coordinate data output from the touch panel 12 according to the operation detection program 302b, and stores the acquired touch coordinate data in the RAM 34 in the time series.

The display program 302c is a program to generate the display image data, that is, screen data, such as the above-described various operation screens, using the image generation data 304b which will be described later, and to output the generated display image data to the display 14.

The recording medium connection program 302d is a program to control writing of data to the various recording media mounted on the recording medium connection unit 16 and reading data from the various recording media The paper piece print program 302e is a program to print a text string, an image, a barcode, or the like on the roll paper by controlling the paper piece printer 18.

The symbol reading program 302f is a program to extract a symbol image from a captured image, which is imaged by the laser scanner or the camera, and to decode the extracted symbol image by controlling the symbol reading unit 20.

The photograph print program 302g is a program to print an image on the photograph paper by controlling the photo printer 26.

The near field communication program 302h is a program to realize data communication with the communication target (for example, the electronic money medium) by controlling the near field communication unit 22. That is, if the near field communication program 302h is executed, the electronic money data is transmitted and received between the near field communication unit 22 and the electronic money medium.

The money processing program 302i is a program to calculate the amount of inserted money in accordance with the type and the number of coins accommodated in the coin storage section and the type and the number of pieces of paper money accommodated in the paper money storage section by controlling the money processing unit 24. In addition, the money processing program 302i is also a program used to return the coins from the coin return opening 24b or to return the paper money from the paper money insertion opening in accordance with the balance, which remains after subtracting the predetermined charge for the service or the like from the amount of inserted money, by controlling the money processing unit 24.

As described above, the electronic money detection program 302j is a program to perform the polling process for the electronic money medium and to detect one or more types of electronic money from the electronic money medium which is held over the near field communication unit 22. In addition, the electronic money detection program 302j is also a program used to detect the electronic money information for the electronic money detected through the polling process.

The determination program 302k is a program to determine whether or not a balance of the electronic money for the settlement reaches the amount of money of the charge of the service or the like.

The settlement program. 302l is a program used to make a state in which it is possible to perform, the settlement by causing the settlement icon 126 to be valid in a case where it is determined that the balance of the electronic money for the settlement reaches the amount of money of the charge of the service or the like in accordance with the determination program 302k. In addition, the settlement program 302l is also a program used to perform the settlement in a case where the settlement icon 126 is valid and the settlement icon 126 is touched.

Meanwhile, although not illustrated in FIG. 7, the program storage area 302 also stores a program to set the charge of the service or the like in the information processing system 100, a program to select and perform various functions included in the information processing device 10, and the like.

In addition, the data storage area 304 of the RAM 34 stores operation input data 304a, image generation data 304b, charge data 304c, inserted money data 304d, balance data 304e, and the like.

The operation input data 304a is data which is acquired by storing the touch coordinate data detected in accordance with the operation detection program 302b in the time series.

The image generation data 304b is data, such as polygon data or texture data to generate the display image data corresponding to the various screens displayed on the display 14.

The charge data 304c is data which corresponds to the charge for the service or the like. The charge data 304c is generated in accordance with the charge for the service or the like if contents of the service or the like, which are desired by the user, are determined. Meanwhile, predetermined charges are previously set for respective products and services which are provided in the information processing system 100.

The inserted money data 304d is data which corresponds to the amount of inserted money. The amount of inserted money is calculated in accordance with the money processing program 302i.

The balance data 304e is data which corresponds to the balance of the electronic money acquired in accordance with the near field communication program 302h. However, there is a case where the balance data 304e includes data which corresponds to the balance of the electronic money of the plurality of brands. In this case, the data corresponding to the balance of the electronic money is managed for each of the brands of the electronic money.

Meanwhile, although not illustrated in FIG. 7, the data storage area 304 stores another data which is desired to execute the information processing program of the information processing device 10, or is provided with a timer (counter) or a register which is desired to execute the information processing program of the information processing device 10.

Figure 8:
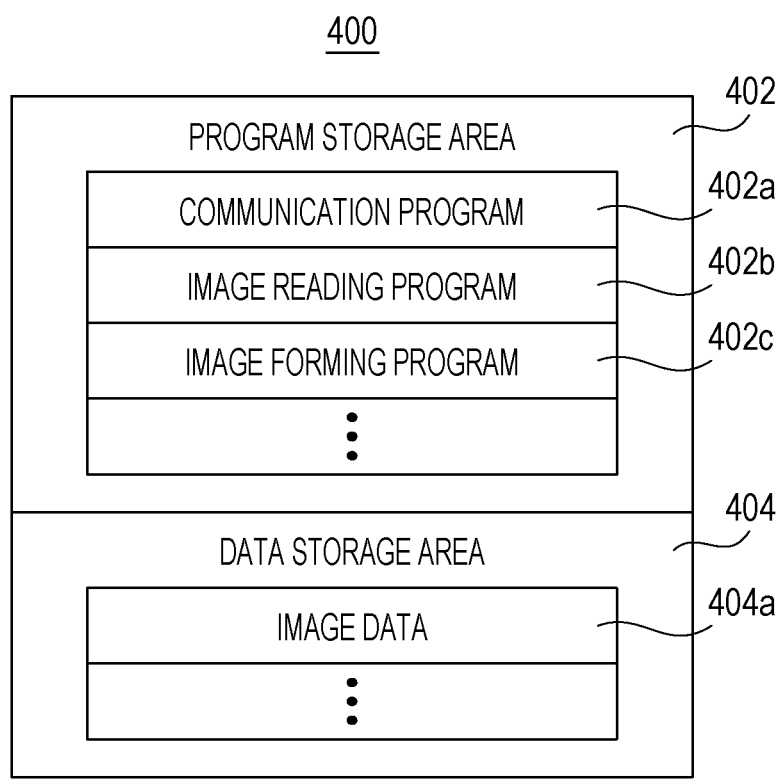
FIG. 8 is a diagram illustrating an example of a memory map of a RAM of the image forming device illustrated in FIG. 3.

FIG. 8 is a diagram illustrating an example of a memory map 400 of the RAM 84 of the image forming device 70 illustrated in FIG. 3. As illustrated in FIG. 8, the RAM 84 includes a program storage area 402 and a data storage area 404. As described above, the program storage area 402 of the RAM 84 stores the information processing program for the image forming device 70. The information processing program for the image forming device 70 includes a communication program 402a, an image reading program 402b, and an image forming program 402c.

The communication program 402a is a program, to perform communication with the information processing device 10, another computer, such as the server, or another machine via the network.

The image reading program 402b is a program to read (scan) an image of a document placed on the document pedestal and to output an image signal (scan image data) corresponding to the read image by controlling the image reading unit 72.

The image forming program 402c is a program to form a multicolor or monochrome image on the recording medium (paper) in accordance with the image data 404a, such as the scan image data or the input image data, by controlling the image forming unit 74.

Meanwhile, although not illustrated in FIG. 8, the program storage area 402 also stores a program or the like to select and perform the various functions included in the image forming device 70.

In addition, the data storage area 404 of the RAM 84 stores the image data 404a or the like. The image data 404a includes image data which is read by the image reading unit 72, image data which is input from the external computer such as the server, and the like.

Meanwhile, although not illustrated in FIG. 8, the data storage area 404 stores another data which is desired to execute the information processing program for the image forming device 70, or is provided with a tinier (counter) or a register which is desired to execute the information processing program for the image forming device 70.

Figure 9:
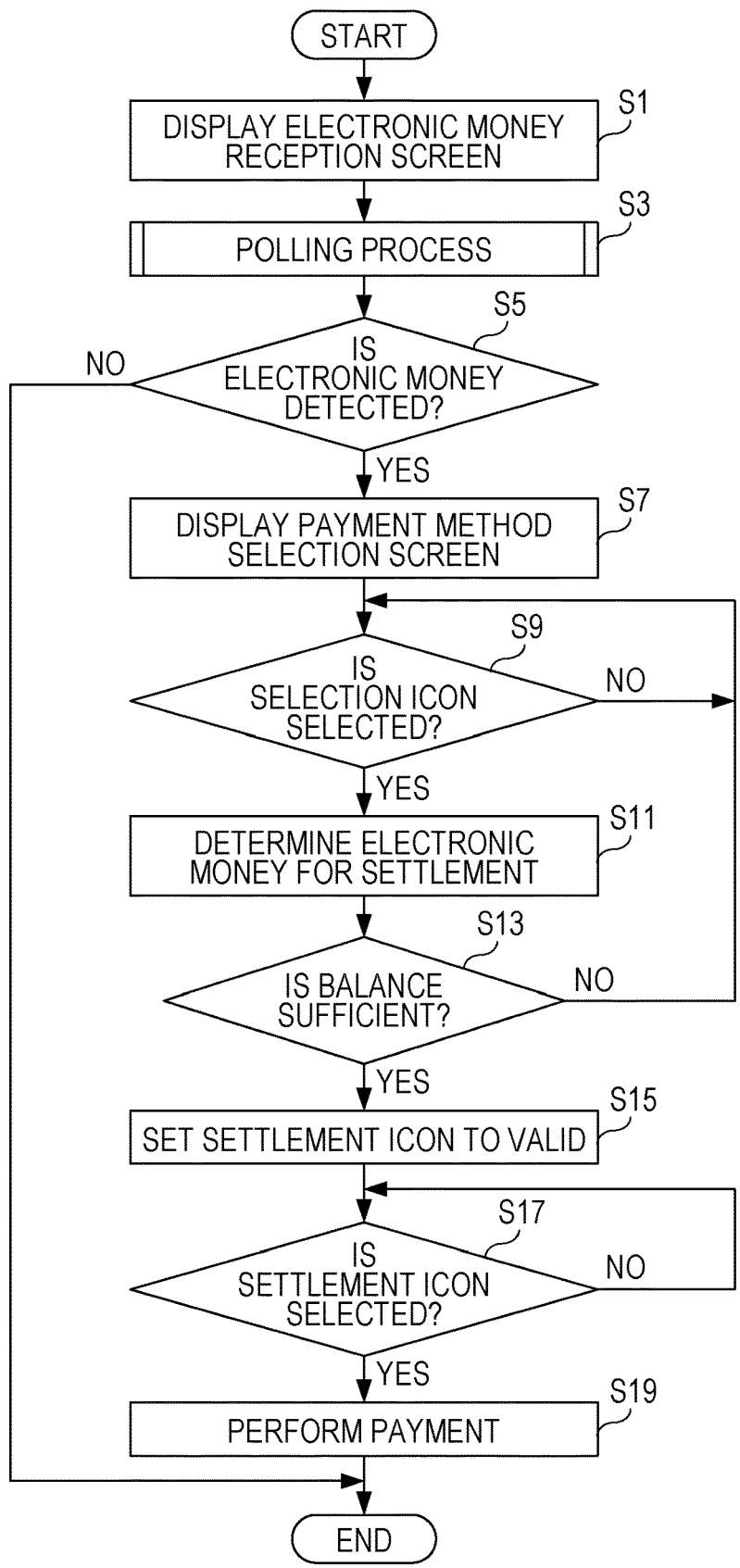
FIG. 9 is a flowchart illustrating an example of a settlement process which is performed in a CPU illustrated in FIG. 2.

FIG. 9 is a flowchart illustrating an example of a settlement process which is performed in a CPU 32 of the information processing device 10 illustrated in FIG. 2. The settlement process starts in a case where contents of the service or the like, which are desired by the user, are determined.

As illustrated in FIG. 9, if the settlement process starts, the CPU 32 of the information processing device 10 causes the display 14 to display the electronic money reception screen 110 in step S1, detects the electronic money through the above-described polling process in step S3, and determines whether or not to detect the electronic money in step S5. Here, it is determined whether or not the electronic money of a brand which is usable in the information processing system 100 is detected.

In a case of "NO" in step S5, that is, in a case where the electronic money of the brand which is usable in the information processing system 100 is not detected, the settlement is not performed, and the settlement process ends. In contrast, in a case of "YES" in step S5, that is, in a case where the electronic money of the brand which is usable in the information processing system 100 is detected, the payment method selection screen 120 is displayed on the display 14 in step S7.

Subsequently, in step S9, it is determined whether or not the selection icon 122 is selected on the payment method selection screen 20. In a case of "NO" in step S9, that is, in a case where the selection icon 122 is not selected, the process returns to step S9. In contrast, in a case of "YES" in step S9, that is, in a case where the selection icon 122 is selected, the electronic money corresponding to the selected selection icon 122 is determined as the electronic money for the settlement in step S11, and it is determined whether or not the balance of the electronic money for the settlement is sufficient in step S13. Here, whether or not the balance of the electronic money for the settlement reaches the amount of money of the charge for the service or the like is determined.

In a case of "NO" in step S13, that is, in a case where the balance of the electronic money for the settlement is not sufficient, the process returns to step S9. In contrast, in a case of "YES" in step S13, that is, in a case where the balance of the electronic money for the settlement is sufficient, the settlement icon 126 is set to valid in step S15, and it is determined whether or not the settlement icon 126 is selected in step S17.

In a case of "NO" in step S17, that is, in a case where the settlement icon 126 is not selected, the process returns to step S17. In contrast, in a case of "YES" in step S17, that is, in a case where the settlement icon 126 is selected, the settlement is performed in step S19, and the settlement, process ends.

In the first embodiment, the electronic money information of the plurality of types of electronic money is detected by executing the polling process for the electronic money medium, and the display 14 is caused to display the detected electronic money information for the electronic money.

Therefore, it is possible to properly recognize the type of the electronic money possessed by the user, and thus it is possible to cause the user to properly manage the plurality of types of electronic money, thereby improving the convenience of the user.

In addition, according to the first embodiment, the detected electronic money information for the electronic money includes the balance of the electronic money, and thus it is possible for the user to grasp the balance of the electronic money.

Furthermore, in the first embodiment, if the payment method for settlement is selected on the payment method selection screen 120, an appropriate hue is attached to the selection icon 122 which is selected by the user. However, it is not desired to be limited thereto. For example, each of the plurality of selection icons 122 may not flicker in a state of being not selected and may flicker in a state of being selected by the user. In this manner, it is possible for the user to recognize whether or not any one of the selection icons 122 is selected even though the hues are not attached to the selection icons 122.

Second Embodiment

An information processing device 10 according to a second embodiment is the same as in the first embodiment other than a fact that the near field communication unit 22 is built in the display 14. Therefore, contents which are different from the first embodiment will be described and duplicated description will not be repeated.

Figure 10:
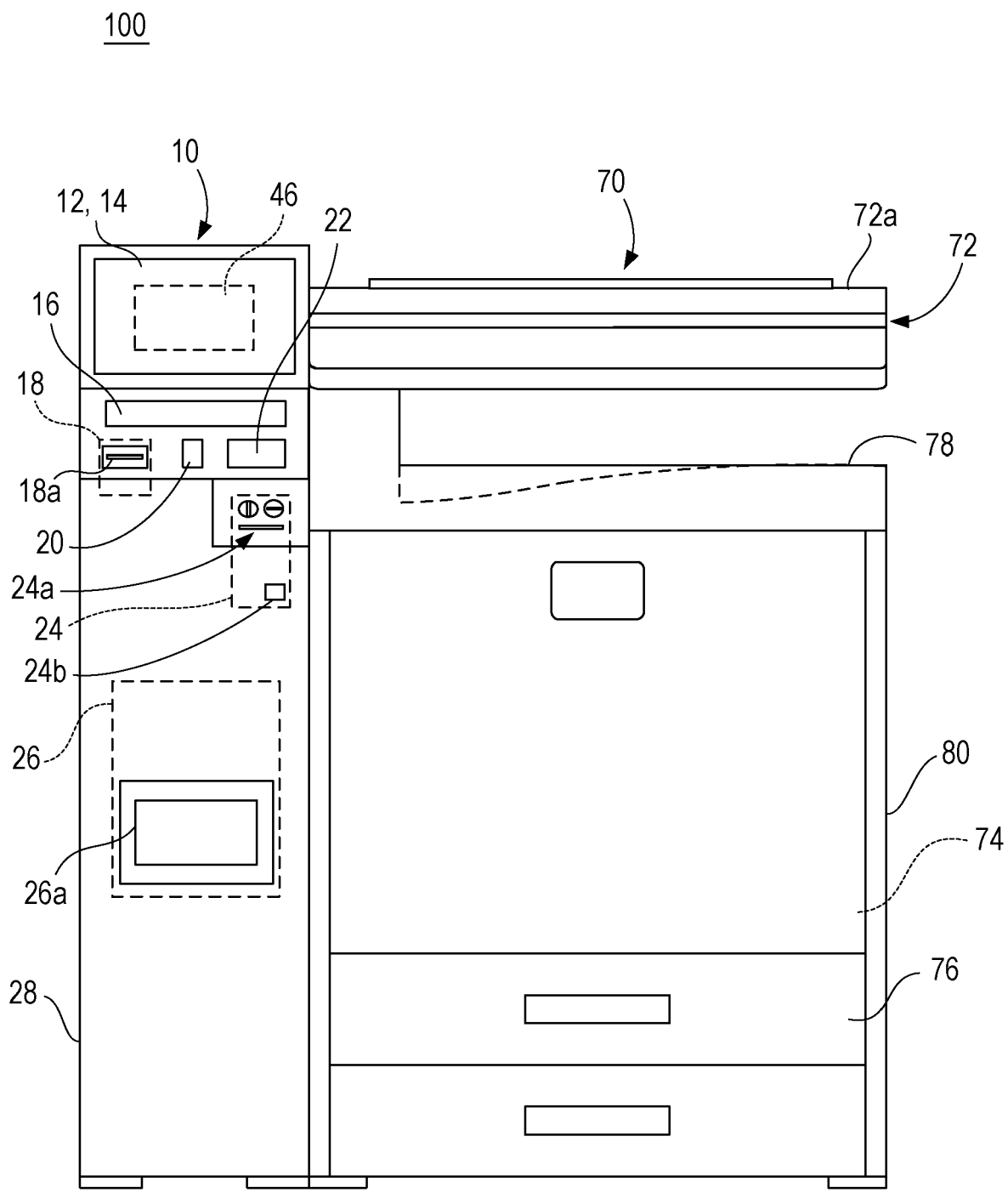
FIG. 10 is a perspective diagram illustrating an exterior configuration of an information processing system according to a second embodiment.
Figure 11:
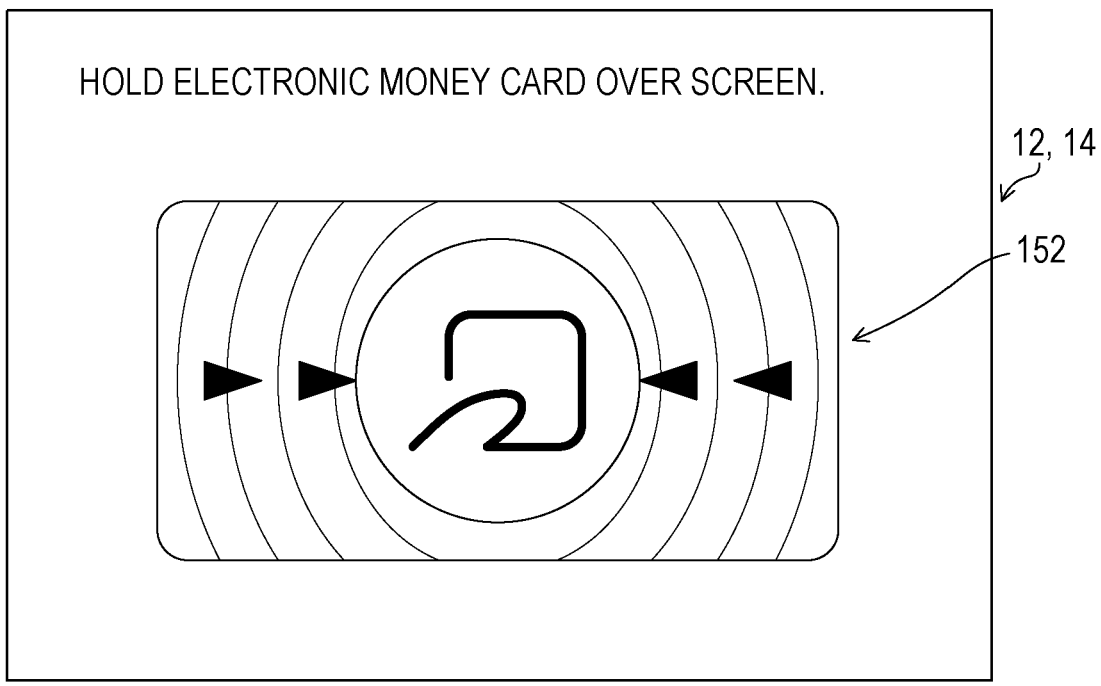
FIG. 11 is a diagram illustrating an example of an electronic money reception screen according to the second embodiment.

FIG. 10 is a perspective diagram illustrating an exterior configuration of an information processing system 100 according to the second embodiment. FIG. 11 is a diagram illustrating an example of an electronic money reception screen 150 according to the second embodiment.

As illustrated in FIG. 10, in the second embodiment, the near field communication unit 22 is provided in (built in) the display 14. Specifically, a transparent antenna, which functions as part of the near field communication unit 22, is embedded in at a central part on a front surface side of the display 14. Therefore, it possible for the near field communication unit 22 to perform contactless data communication in a wireless manner with a communication target, such as the electronic money medium, which is held over the central part on the front surface side of the display 14.

If the contents of the service or the like, which are desired by the user, are determined in the information processing system 100 according to the second embodiment, the electronic money reception screen 150 is displayed on the display 14 as illustrated in FIG. 11, instead of the electronic money reception screen 110 according to the first embodiment.

At a center of the electronic money reception screen 150, a reader/writer area 152, which indicates an area (an area suitable for the communication) where it is possible to perform communication between the near field communication unit 22 and the electronic money medium, is provided. The reader/writer area 152 is provided in a location corresponding to the transparent antennal of the near field communication unit 22 embedded in tine display 14. In addition, in the reader/writer area 152, a suitable figure which indicates that the reader/writer area 152 functions as a reader/writer is described. In addition, in the electronic money reception screen 150, a suitable text string, a figure, or the like, which prompts the user to hold the electronic money medium possessed by the user over the reader/writer area 152, is displayed.

Furthermore, if the electronic money medium is held over the reader/writer area 152, the near field communication unit 22 communicates with the electronic money medium. Accordingly, the information processing device 10 acquires the electronic money data (electronic money information) relevant to the electronic money, which is included in the electronic money medium.

In the second embodiment, the near field communication unit 22 is built in the display 14, and the reader/writer area 152 is provided in the operation screen displayed on the display 14. Therefore, it is easy to intuitively recognize a location, over which the electronic money medium to be held, and a user who is not familiar with the payment using the electronic money easily understands the operation method.

Third Embodiment

An information processing device 10 according to a third embodiment is the same as in the second embodiment other than a fact that a method for selecting the electronic money for the settlement is different. Therefore, contents which are different from the second embodiment will be described and duplicated description will not be repeated.

Figure 12:
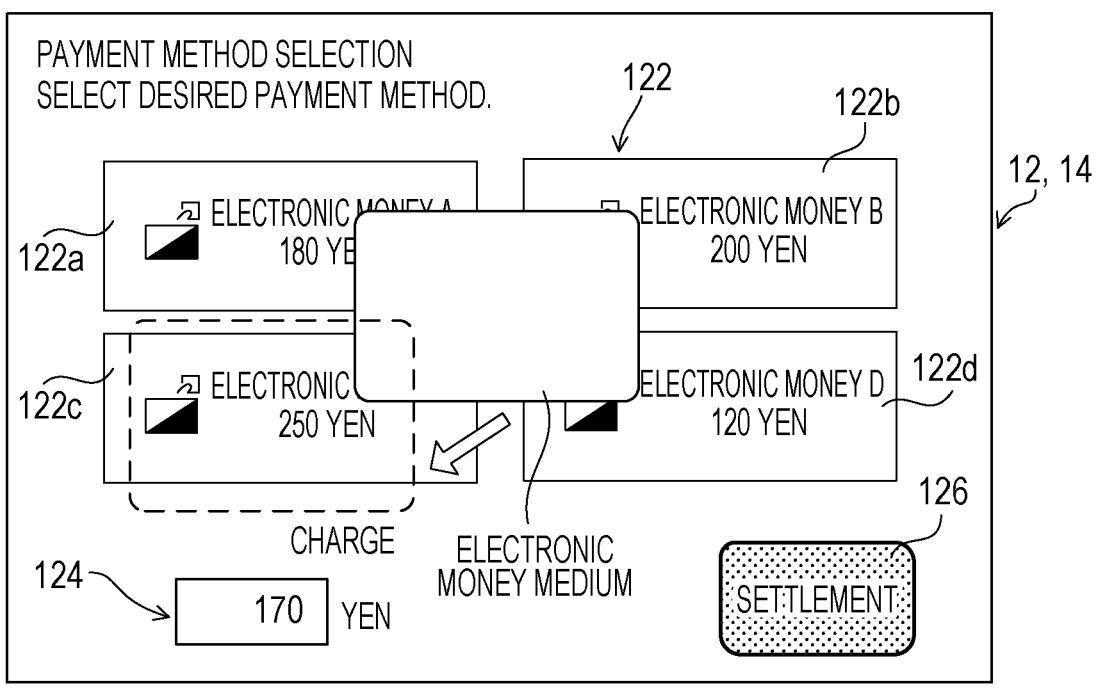
FIG. 12 is a diagram illustrating an example of a payment method selection screen according to a third embodiment.
Figure 13:
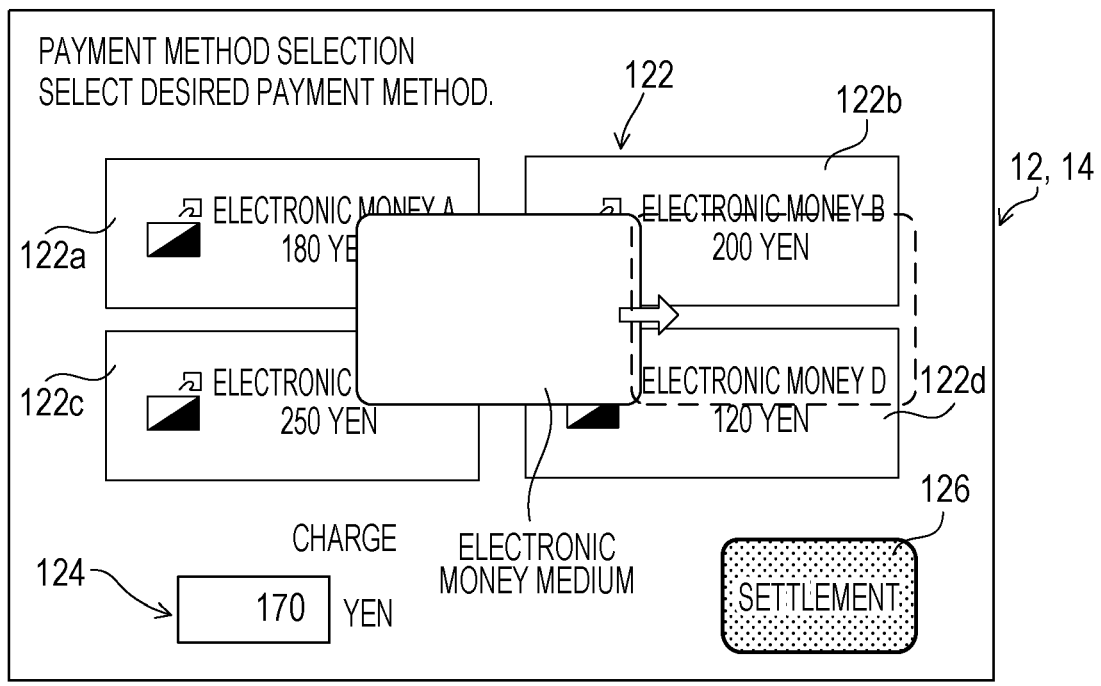
FIG. 13 is a diagram illustrating an example of the payment method selection screen according to the third embodiment.
Figure 14:
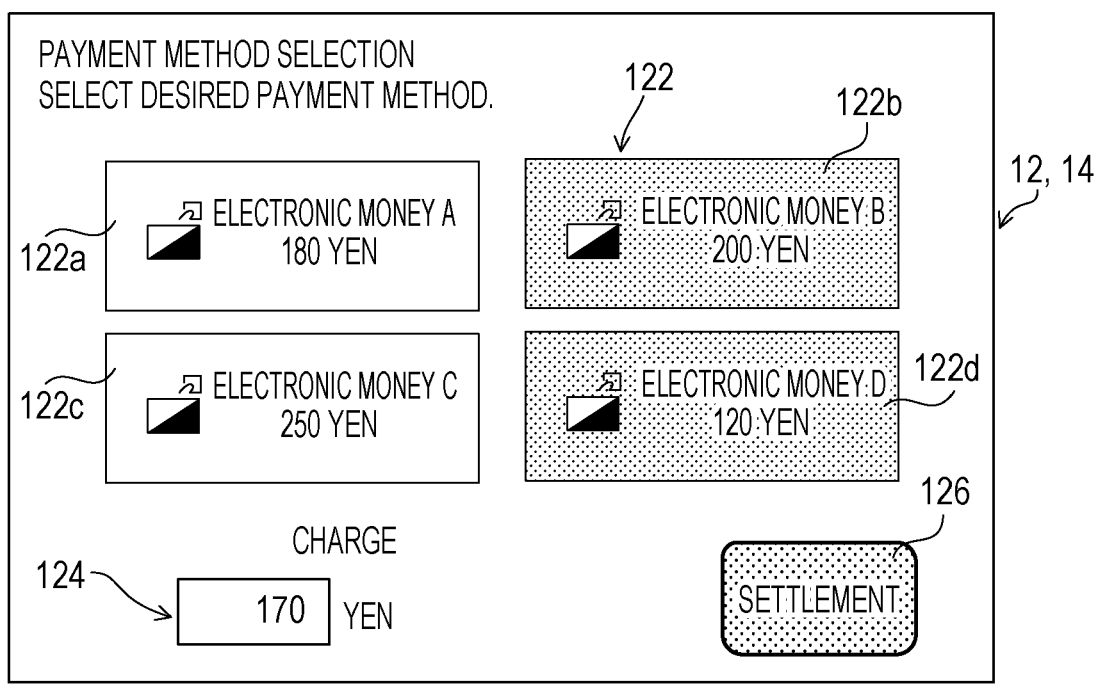
FIG. 14 is a diagram illustrating an example of the payment method selection screen according to the third embodiment.

FIG. 12 is a diagram illustrating an example of a payment method selection screen 120 according to the third embodiment. FIG. 13 is a diagram illustrating an example of the payment method selection screen 120 according to the third embodiment. FIG. 14 is a diagram illustrating an example of the payment method selection screen 120 according to the third embodiment.

In the third embodiment, if the electronic money data is read in accordance with the electronic money reception screen 150 illustrated in FIG. 11, the payment method selection screen 120 is displayed on the display 14, as illustrated in FIG. 12.

Here, when the display of the display 14 is switched from the electronic money reception screen 150 into the payment method selection screen 120, a state in which the electronic money medium is held over a location corresponding to the reader/writer area 152 of the electronic money reception screen 150 is made. That is, the electronic money medium is located at the central part of the display 14.

In the third embodiment, in a case where the electronic money medium is moved after the electronic money reception screen 150 is switched into the payment method selection screen 120, the electronic money for the settlement is determined in accordance with the location of the electronic money medium to the display 14. Specifically, in the payment method selection screen 120, the electronic money corresponding to the icon corresponding to the location of the moved electronic money medium is selected as the electronic money for the settlement. That is, the user may move the electronic money medium from the central part of the display 14 to a location corresponding to an icon which is desired to be selected as the electronic money for the settlement. For example, as illustrated in FIG. 12, in a case where the electronic money medium is moved in a lower left (on the left front side) direction from the central part of the display 14, the electronic money medium is superimposed on part of the selection icon 122c. That is, the electronic money medium is moved to a location corresponding to the selection icon 122c. Here, the electronic money C corresponding co the selection icon 122c is selected as the electronic money for the settlement.

In addition, in the third embodiment, it is possible to collectively select the plurality of types of electronic money for the settlement in accordance with the location of the electronic money medium. For example, as illustrated in FIG. 13, in a case where the electronic money medium is moved in a right direction from the central part of the display 14, the electronic money medium is superimposed on the selection icon 122b and the selection icon 122d. That is, the electronic money medium is moved to a location corresponding to the selection icon 122b and the selection icon 122d. Here, as illustrated in FIG. 14, the electronic money B corresponding to the selection icon 122b and the electronic money D corresponding to the selection icon 122d are selected as the electronic money for the settlement. As described above, in a case where the plurality of types of electronic money for the settlement are selected, the settlement icon 126 is set to valid in a case where the total amount of money of the balances of the plurality of the electronic money for the settlement reaches the amount of money of the charge for the service or the like.

Subsequently, a method for detecting the location of the electronic money medium relative to the display 14 will be described. For example, a plurality of antennas of the near field communication unit 22 are provided in the display 14, and distances between each of the antennas and the electronic money medium are calculated based on an intensity of a radio wave in near field wireless communication between each of the antennas and the electronic money medium. Furthermore, it is possible to detect the location of the electronic money medium relative to the display 14 according to the distances between each of the antennas and the electronic money medium (distances from a plurality of points).

In addition, in a case where an electrostatic capacitive type touch panel is used as the touch panel 12, it is possible to detect the location of the electronic money medium relative to the display 14 in accordance with a change in electro capacitance in the touch panel 120

Furthermore, a detection sensor, which is used to detect the location of the electronic money medium relative to the display 14, may be further provided in the information processing device 10. It is possible to use an infrared sensor, a camera, or the like as the detection sensor. For example, in a case where the infrared sensor is used as the detection sensor, a case where a plurality of the infrared sensors are provided in a housing of the display 14, the device main body 28, or the like may be taken in consideration. In this manner, it is possible to calculate distances between each of the infrared sensors and the electronic money medium in accordance with an output of each of the infrared sensors, and it is possible to detect the location of the electronic money medium relative to the display 14 according to the distances between each of the infrared sensors and the electronic money medium. In addition, in a case where the camera is used as the detection sensor, a range which includes the display 14 is captured by the camera, an image process is performed on the captured image, an image of the electronic money medium is extracted from the captured image, and thus it is possible to detect the location of the electronic money medium relative to the display 14 in accordance with a location of the image of the electronic money medium in the captured image.

Hereinafter, a settlement process according to the third embodiment will be described using a flowchart. The same reference symbols are attached to the same processes as in the settlement process described according to the first embodiment, and duplicated contents will not be described or simply described.

Figure 15:
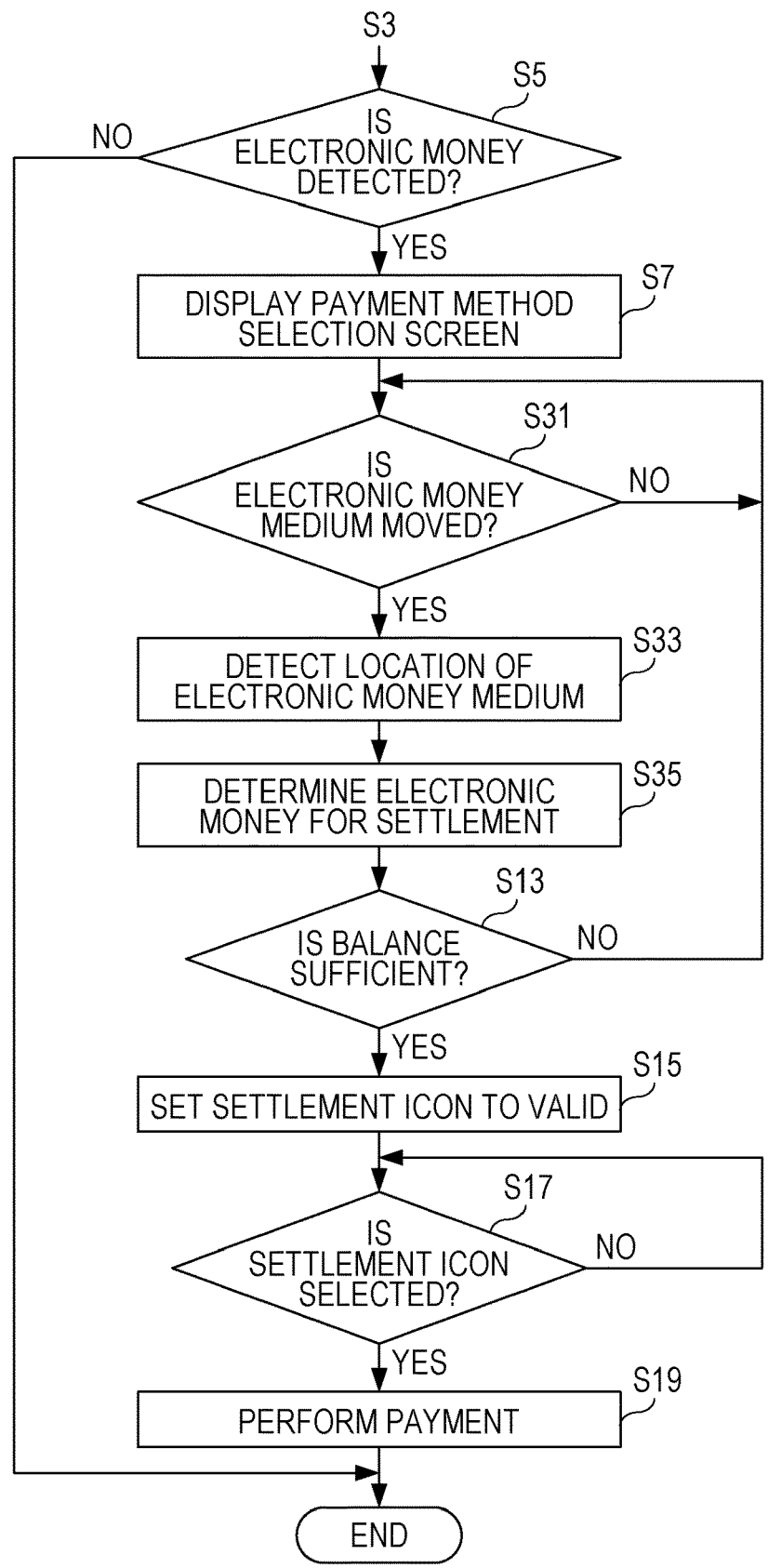
FIG. 15 is a flowchart illustrating an example of the settlement process according to the third embodiment.

FIG. 15 is a flowchart illustrating an example of the settlement process according to the third embodiment. As illustrated in FIG. 15, if the settlement process starts, the CPU 32 displays the payment method selection screen 120 on the display 14 in step S7, and determines whether or not the electronic money medium is moved in step S31.

In a case of "NO" in step S31, that is, in a case where the electronic money medium is not moved, the process returns to step S31. In contrast, in a case of "YES" in step S31, that is, in a case where the electronic money medium is moved, the location of the electronic money medium relative to the display 14 is detected in step S33, the electronic money for the settlement is determined in accordance with the location of the electronic money medium, which is detected in step S33, in step S35, and the process proceeds to step S13. Meanwhile, in a case where a plurality of types of electronic money for the settlement are selected, it is determined whether or not a total amount of balances of the electronic money for the settlement reaches the amount of money of the charge for the service or the like in step S13.

Meanwhile, contents of the process up to step S7 and contents of the process subsequent, to step S13 are the same as in the first embodiment, and thus the description thereof will not be repeated.

According to the third embodiment, the location of the electronic money medium relative to the display 14 is detected and the electronic money for the settlement is determined in accordance with the detected location of the electronic money medium. Therefore, it is not demanded to touch the selection icon 122, and thus even a user who is not familiar with the payment by the electronic money easily understands the operation method.

In addition, according to the third embodiment, it is possible to select the electronic money for the settlement while holding the electronic money medium in subsequent to an operation of holding the electronic money medium over the reader/writer area 152 of the display 14, thereby increasing convenience.

Meanwhile, according to the third embodiment, the electronic money for the settlement is determined according to the location of the electronic money medium relative to the display 14. However, in addition thereto, the electronic money for the settlement may be determined by selecting the selection icon 122, similar to the first embodiment and the second embodiment.

Meanwhile, in the embodiment, the case where the electronic money which may be selected as the payment method is the prepaid-type electronic money is described. However, it is not desired to be limited thereto. For example, later payment (postpaid)-type electronic money may be selected as the payment method. In the postpaid-type electronic money, the amount of payable money is set to the amount of money which is the same as the amount of money of the charge. Therefore, it is determined that the total amount of payable money reaches the amount of money of the charge of the service or the like in a point of time at which the postpaid-type electronic money is selected as the payment method.

In addition, in the above-described embodiments, the electronic money data, which is stored in the electronic money medium, includes the balance of the electronic money. However, it is not desired to be limited thereto. For example, instead of the balance of the electronic money, the electronic money data may include identification information to identify the user (or the electronic money medium itself) who uses (possesses) the electronic money medium. In this case, the balance of the electronic money is stored in the storage unit of the external computer, such as the server, which is capable of communicating with the information processing device 10. However, the balance of the electronic money is stored in association with the identification information. Therefore, if the information processing device 10 acquires the identification information stored in the electronic money medium, the information processing device 10 accesses the storage unit of the external computer, and acquires the balance of the electronic money which is associated with the identification information.

Furthermore, in a case where the balance of the electronic money for the settlement reaches the amount of money of the charge for the service or the like, the settlement icon 126 is set to valid. In addition thereto, a notification image, which includes a message to notify the user that the settlement is permitted, a message to notify the user that the total amount of payable money reaches the amount of money relevant to the charge of the service or the like, and the like, may be displayed on the display 14. In this manner, it is possible to cause the user to recognize that the settlement is permitted. In addition, in a case where the balance of the electronic money for the settlement does not reach the amount of money of the charge for the service or the like, the settlement icon 126 is set to invalid. In addition thereto, a notification image, which includes a message to notify the user that the settlement is not permitted, a message to notify the user that the total amount of payable money does not reach the amount of money relevant to the charge of the service or the like, and the like, may be displayed on the display 14. In this manner, it is possible to cause the user to recognize that the settlement is not permitted (the balance of the electronic money for the settlement is not sufficient).

Furthermore, the numerical values, the screens, the detailed configurations, and the like which are provided in the above-described embodiments are examples, and appropriate changes are possible according to actual products. In addition, it is possible to appropriately change a processing sequence of the respective steps of the flowchart, which is illustrated in the above-described embodiment, if the same result may be acquired.

The present disclosure contains subject matter related to that disclosed in Japanese Priority Patent Application JP2017-212190 filed in the Japan Patent Office on Nov. 1, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device, which includes a display and an electronic money reading unit, a plurality of types of electronic money being available at the information processing device, the information processing device comprising:

an electronic money detection section that is able to detect electronic money corresponding to an electronic money medium from among the plurality of types of electronic money by the electronic money reading unit by executing a polling process of sequentially switching a plurality of signals corresponding to the plurality of types of electronic money at predetermined time interval to transmit the signals to the electronic money medium when the electronic money medium is readable by the electronic money reading unit;

an electronic money information detection section that detects electronic money information on the electronic money detected by the electronic money detection section; and a display section that causes the display to display the electronic money information, which is detected by the electronic money information detection section.

2. The information processing device according to claim 1, wherein the electronic money information includes information on a balance of the electronic money.

3. The information processing device according to claim 1, wherein the electronic money reading unit is built in the display.

4. The information processing device according to claim 3, further comprising:

a location detection section that detects a location of the electronic money medium with respect to the display;

a determination section that determines electronic money for settlement in accordance with the location of the electronic money medium detected by the location detection section; and a settlement section that executes the settlement by the electronic money for the settlement, which is determined by the determination section.

5. An information processing system comprising:

the information processing device according to claim 1; and an image forming device that is communicable with the information processing device.

6. A computer readable medium storing a control program of an information processing device, which includes a display and an electronic money reading unit, a plurality of types of electronic money being available at the information processing device, the control program causing a processor of the information processing device to function as:

an electronic money detection section that is able to detect electronic money corresponding to an electronic money medium from among the plurality of types of electronic money by the electronic money reading unit by executing a polling process of sequentially switching a plurality of signals corresponding to the plurality of types of electronic money, at predetermined time interval to transmit the signals to the electronic money medium when the electronic money medium is readable by the electronic money reading unit;

an electronic money information detection section that detects electronic money information on the electronic money detected by the electronic money detection section; and a display section that causes the display to display the electronic money information, which is detected by the electronic money information detection section.

7. A control method causing a processor of an information processing device, which includes a display and an electronic money reading unit, to perform a process, a plurality of types of electronic money being available at the information processing device, the process comprising:

detecting electronic money corresponding to an electronic money medium from among the plurality of types of electronic money by the electronic money reading unit by executing a polling process of sequentially switching a plurality of signals corresponding to the plurality of types of electronic money at predetermined time interval to transmit the signals to the electronic money medium when the electronic money medium is readable by the electronic money reading unit;

detecting electronic money information on the detected electronic money; and causing the display to display the detected electronic money information.

8. The information processing device according to claim 1, wherein the electronic money detection section is able to detect electronic money corresponding to each of a plurality of simultaneously held electronic money media from among the plurality of types of electronic money by the electronic money reading unit by executing the polling process of sequentially switching the plurality of signals corresponding to the plurality of types of electronic money at the predetermined time interval to transmit the signals to the plurality of simultaneously held electronic money media when the plurality of simultaneously held electronic money media are readable by the electronic money reading unit.

9. The information processing device according to claim 4, wherein if the location detection section detects that the electronic money medium is superimposed on two or more selection icons displayed on the display corresponding to two or more types of electronic money, the determination section selects the two or more types of electronic money as the electronic money for settlement.

* * * * *